US012578355B2

(12) United States Patent

Traeff et al.

(10) Patent No.: US 12,578,355 B2

(45) Date of Patent: Mar. 17, 2026

(54) METHOD AND APPARATUS FOR DETERMINING A PROBABILITY OF A PRESENCE OF A MOVEMENT OF INTEREST OF A BIKE

(71) Applicant: Robert Bosch GmbH, Stuttgart (DE)

(72) Inventors: Gustav Traeff, Lund (SE); Jakob Andren, Lund (SE); Linnea Andersson, Lund (SE)

(73) Assignee: Robert Bosch GmbH, Stuttgart (DE)

( * ) Notice: Subject to any disclaimer, the term of this patent is extended or adjusted under 35 U.S.C. 154(b) by 405 days.

(21) Appl. No.: 18/311,403

(22) Filed: May 3, 2023

(65) Prior Publication Data

US 2023/0358780 A1 Nov. 9, 2023

(30) Foreign Application Priority Data

May 4, 2022 (DE) .......................... 102022204413.4

(51) Int. Cl.
| | |
|---|---|
| *G01P 13/00* | (2006.01) |
| *B62H 5/20* | (2006.01) |
| *B62J 45/41* | (2020.01) |

(52) U.S. Cl.
CPC ................ *G01P 13/00* (2013.01); *B62H 5/20* (2013.01); *B62J 45/41* (2020.02)

(58) Field of Classification Search
USPC ......................................................... 702/181
See application file for complete search history.

(56) References Cited

U.S. PATENT DOCUMENTS

| | | | |
|---|---|---|---|
| 2015/0266477 A1* | 9/2015 | Schmudderich ...... | B60W 30/09 |
| | | | 701/98 |
| 2016/0259043 A1* | 9/2016 | Schär .................... | G01S 13/723 |
| 2018/0009497 A1* | 1/2018 | Erickson ................. | B62H 7/00 |

FOREIGN PATENT DOCUMENTS

| | | |
|---|---|---|
| DE | 10 2018 004 119 A1 | 11/2019 |
| DE | 10 2020 110 822 A1 | 10/2021 |

* cited by examiner

*Primary Examiner* — Paul D Lee

(74) *Attorney, Agent, or Firm* — Maginot, Moore & Beck LLP

(57) ABSTRACT

A method for determining a probability of a presence of a movement of interest of a bike is disclosed. The method includes (i) sensing a first indicator indicating a degree of a first movement of the bike or a probability of a presence of a specific first movement of the bike by way of a variable value, (ii) sensing a second indicator indicating a degree of a second movement of the bike or a probability of a presence of a specific second movement of the bike by way of a variable value, (iii) calculating a first change value from the first indicator by way of a first mapping function, wherein, by way of the first mapping function, various possible values of the first indicator are respectively associated with a first change value, (iv) calculating a second change value from the second indicator by way of a second mapping function, wherein, by way of the second mapping function, various possible values of the second indicator are respectively associated with a second change value, and (v) adjusting a first probability, which is a probability of a presence of a movement of interest, wherein the first probability is incremented or decremented depending on the first change value and the second change value.

11 Claims, 4 Drawing Sheets

METHOD AND APPARATUS FOR DETERMINING A PROBABILITY OF A PRESENCE OF A MOVEMENT OF INTEREST OF A BIKE

This application claims priority under 35 U.S.C. § 119 to application no. DE 102022204413.4, filed on May 4, 2022 in Germany, the disclosure of which is incorporated herein by reference in its entirety.

BACKGROUND

The present disclosure relates to a method and apparatus for determining a probability of a presence of a movement of interest of a bike.

Electric bikes provide a convenient and efficient method of travel. However, electric bikes can especially also be very expensive, making them a coveted target for thieves.

In order to prevent or at least detect a possible theft of a bike, modern bikes are often equipped with sensors and software that allow for a monitoring of a position and movement of the bike. If the bike is moved, this can be detected as a movement of interest, and an operator can be notified of the movement of the bike. In this context, it is also common to continuously monitor a position of the bike until the bike is not moved further. Thus, a user is able to track a position of their bike and possibly regain it after a theft.

One challenge is to distinguish a random movement of the bike from those movements that indicate a theft of the bike or an unauthorized movement of the bike. This can be accomplished in a variety of ways and based on various sensors. Especially when the information of various sensors is to be combined, it is necessary to use a reliable and robust algorithm. Such an algorithm is provided according to the present disclosure.

SUMMARY

The method according to the present disclosure for determining a probability of a presence of a movement of interest of a bike comprises sensing a first indicator indicating a degree of a first movement of the bike or a probability of a presence of a specific first movement of the bike by means of a variable value; sensing a second indicator indicating a degree of a second movement of the bike or a probability of a presence of a specific second movement of the bike by means of a variable value; calculating a first change value from the first indicator by means of a first mapping function, wherein, by means of the first mapping function, various possible values of the first indicator are respectively associated with a first change value; calculating a second change value from the second indicator by means of a second mapping function, wherein, by means of the second mapping function, various possible values of the second indicator are respectively associated with a second change value; and adjusting a first probability, which is a probability of a presence of a movement of interest, wherein the first probability is incremented or decremented depending on the first change value and the second change value.

The apparatus according to the disclosure for determining a probability of a presence of a movement of interest of a bike comprises a signal processing unit configured for sensing a first indicator indicating a degree of a first movement of the bike or a probability of a presence of a specific first movement of the bike by means of a variable value; sensing a second indicator indicating a degree of a second movement of the bike or a probability of a presence of a specific second movement of the bike by means of a variable value; calculating a first change value from the first indicator by means of a first mapping function, wherein, by means of the first mapping function, various possible values of the first indicator are respectively associated with a first change value; calculating a second change value from the second indicator by means of a second mapping function, wherein, by means of the second mapping function, various possible values of the second indicator are respectively associated with a second change value; and adjusting a first probability, which is a probability of a presence of a movement of interest, wherein the first probability is incremented or decremented depending on the first change value and the second change value.

The first indicator and the second indicator are configured such that they indicate a degree of movement of the bike or a probability of a presence of a specific movement of the bike. If a degree of movement of the bike is indicated by the first indicator or the second indicator, this is indicated in particular by the fact that the movement is converted into a value representative of the movement. When movements are able to occur in various directions, it is advantageous to determine an amount of the movement. If the movement is, for example, a lateral tilting of the bike, the degree of movement is indicated, for example, by an angle. For example, if the movement is a forward rolling of the bike, the degree of movement can be described by a speed of the forward rolling. If the indicator is a probability of a presence of a specific movement of the bike, the indicator indicates the probability of a predefined movement. If the specific movement of the bike is, e.g., a carrying of the bike, an indicator is provided which increases when sensor information indicates that the bike is being carried. If the specific movement of the bike is, for example, a rearward pushing of the bike, an indicator is provided, which increases when sensor information indicates that the bike is being pushed rearward. The specific movement can be any movement of the bike, which is not necessarily directly coupled to a conventional measured value, by which such movement is described. However, a signal processing is stored, which allows the determination from the sensor information as to whether a probability for the predefined specific movement is given. With the method according to the disclosure, indicators which are of a different nature can also be combined. Thus, for example, the first indicator can indicate a degree for a first movement of the bike and the second indicator can indicate a probability of a presence of a specific second movement of the bike. Given that both the first indicator and the second indicator are mapped to a change value, the indicators are not bound to being reflected by a common unit of magnitude.

Both the first indicator and the second indicator are in this case based on the measured values of a sensor system of the bike. The first indicator is in this case preferably generated based on a first sensor and the second indicator is generated based on a second sensor, the first sensor being different from the second sensor. However, it is also advantageous when both the first indicator and the second indicator are generated based on a common sensor technology, but based on a different signal processing. Thus, for example, by means of a magnetic field sensor, both an indicator of a probability of a rearward rolling of the bike and an indicator of a speed of a movement of the bike can be determined.

A change value is determined for each of the indicators. This is done by means of an associated mapping function. By means of the mapping function, a change value is associated with a given value of the respective indicator, wherein the change value is in particular a probability step, i.e. a value that describes how much a probability is increased or lowered. The mapping function can in this case be any function, but is preferably designed to have linear portions. It is also advantageous when the mapping function comprises one or more non-linear portions, in particular those portions which can be defined by a polynomial. The mapping function is preferably stored as a mathematical formula for digital signal processing. Further preferably, the mapping function is a continuously increasing function.

Based on the change values, a first probability is adjusted, which is a probability of a presence of a movement of interest. Initially, the first probability can in this case preferably be initialized with the value of "zero." As the method proceeds, it is continuously adjusted based on the previously determined change values, wherein this is either incremented or decremented depending on the change value. Preferably, a resulting change value is determined from the determined change values, and the first probability is incremented according to the resulting change value when it is positive, and the first probability is decremented according to the resulting change value when it is negative. The adjustment of the first probability based on the change values can be done in various ways. For example, the first change value can be compared to the second change value, and the respective greater change value can be added to the first probability. Alternatively, the first probability can be adjusted by adding the first change value and the second change value. A weighting of the change values prior to adjusting the first probability is also advantageous. The first probability is thus a value that increases or optionally also decreases depending on the first indicator and the second indicator. In order to merge the first indicator and the second indicator, they are each converted into a change value which define probability steps and are thus both suitable for adjusting the first probability.

The method is in this case particularly advantageous, because a wide variety of sensor information can be gathered from uncalibrated sensors, which is possible with little computational effort and storage capacities. In this context, a probability theory approach is taken, in which case a categorization of any given movement can also take place. For example, it can be recognized whether there is a movement of interest and as such it can be distinguished from other movements that are not of interest. The method is very stable against interferences and influences caused by accidental touching of the bike, for example, when another bike is parked in the vicinity of the bike. The method is in this case easily adjustable, which can be done in particular by adjusting the mapping functions. The method is also insensitive with respect to an arrangement of an associated sensor technology and can thus be used independently for different bikes with different design specifications.

The method according to the disclosure can be achieved in a particularly energy-saving manner and can therefore also be used in particular when the bike is parked and, for example, a secondary power supply must be used because a primary battery has been removed for a charging operation. Also resulting from the properties of the method is that false detections are unlikely and occur rarely, which ultimately also leads to an improved user experience.

Optionally, the first probability is also adjusted based on one or more further change values, each determined based on an associated further indicator and an associated further mapping function. Thus, any desired number of indicators can be integrated into a curve of the first probability.

The method is not limited to the use of a first indicator and a second indicator. For example, at least one further indicator is preferably detected, wherein each of the further indicators respectively indicates a degree of further movement of the bike or a probability of a presence of a specific further movement of the bike by a variable value. Accordingly, a further change value is respectively calculated from the further indicators by means of a respective associated further mapping function, whereby, by each further mapping function, various possible values of a further indicator are respectively associated with a further change value. The adjustment of the first probability is incremented or decremented depending on the first change value, the second change value, and the one or more change values.

Preferred embodiments of the disclosure are further set forth below.

Preferably, it is further detected that the movement of interest is given when the first probability exceeds a predefined first threshold. The detection that the movement of interest is given thus occurs in response to the first probability exceeding the predefined first threshold. The first probability typically increases with a presence of positive change values. If one of the mapping functions features a range that results in negative change values, then the first probability drops in the case of negative change values. To what degree this occurs, i.e. how quickly, is also dependent on how the change values are combined in order to adjust the first probability. Preferably, however, a value is created, in this case the first probability, which increases comparatively quickly when one of the indicators indicates a presence of a certain movement with a high probability or indicates a degree of movement which is clearly indicative of a movement of the bike. If such scenarios occur, the probability will increase until the first threshold is exceeded.

Preferably, it is detected that the movement of interest is no longer given when the first probability falls below a predefined second threshold, the second threshold being less than the first threshold. The detection that the movement of interest is no longer present thus occurs in response to the fact that the first probability falls below the predefined first threshold. This occurs in particular when the present values of the indicators are mapped to negative change values. This is the case when, e.g., no movement or only a very low movement of the bike is indicated as a degree of movement by the indicators, or the probability of a presence of a specific movement of the bike is low. The first probability thus either increases or decreases depending on the present first indicator and second indicator. If this decreases for a correspondingly long time, because negative change values are integrated into the first probability for a correspondingly long time, it can be assumed that the movement of interest is not or no longer given. This is detected when the first probability falls below the second threshold.

It is also advantageous when the first mapping function is a function $f_1(x_1)$, which describes the first change value, wherein $x_1$ is the value of the first indicator, wherein the first mapping function is monotonically increasing and features a zero-crossing, and/or the second mapping function is a function $f_2(x_2)$, which describes the second change value, wherein $x_2$ is the value of the second indicator, wherein the second mapping function is monotonically increasing and features a zero-crossing. If the mapping function is monotonically increasing and features a zero-crossing, the result is that the associated change value is either positive or negative. This ensures that the first probability either increases when indicated by the first and second indicators, or decreases when indicated by the first and second indicators. This creates a system that is stable, because the first probability either increases or decreases, but a resetting is not necessary. The first probability is preferably limited to a maximum value and a minimum value, in particular to a range of values between "0" and "1." The first probability does not increase further if it has reached the maximum value, for example the value of "1," and does not decrease further if it has reached the minimum value, e.g., the value of "0."

Also, it is advantageous when the first mapping function and/or the second mapping function are selected such that the first change value and the second change value are the maximum size of a predefined maximum value, which is preferably less than the first threshold, in particular less than an integer factor of the first threshold. Also, it is advantageous when the first mapping function and/or the second mapping function are selected such that the first change value and the second change value are the minimum size of a predefined minimum value, whose value is preferably less than the second threshold, in particular less than an integer factor of the second threshold. It is thus necessary that the first probability is increased multiple times when adjusting the first probability across several steps before exceeding the first threshold. Thus, it is necessary that the first indicator and the second indicator lead to an increase in the first probability after applying the respective associated mapping function for a predefined time range. Thus, individual erroneous measured values resulting in incorrect indicators are treated such that they do not immediately lead to the detection of a movement of interest. The system is thus particularly error-resistant. The maximum values are in this case preferably defined by means of the mapping functions.

It is also advantageous when the method further comprises calculating a third change value from the first indicator by means of a third mapping function, wherein, by the third mapping function, various possible values of the first indicator are respectively associated with a third change value, wherein the third mapping function is selected such that the third change value is less than the first change value for at least some of the possible values of the first indicator. In this context, it is also advantageous when a further calculating a fourth change value from the second indicator is performed by means of a fourth mapping function, wherein, by means of the fourth mapping function, various possible values of the second indicator are respectively associated with a fourth change value, wherein the fourth mapping function is selected such that the fourth change value is less than the second change value for at least some of the possible values of the second indicator, and a second probability is adjusted, which is a probability of a presence of a significant movement of interest, wherein the second probability is incremented or decremented depending on the third change value and the fourth change value. Thus, the first indicator is mapped not only to a first change value, but also to a third change value. Accordingly, the second indicator is mapped not only to the second change value, but also to a fourth change value. This is done on the basis of other mapping functions different from the first mapping function and the second mapping function. In the present context, these differ in that the third change value is less than the first change value, in particular for the positive value range above a zero-crossing of the third mapping, and the fourth change value is less than the second change value, in particular for the positive value range above a zero-crossing of the fourth mapping function. The first probability and the second probability are determined in substantially the same way, but with different mapping functions being applied. This results in the second probability increasing more slowly than the first probability. The second probability thus creates a value that is less sensitive than the first probability. If the first and second probabilities are compared to equal or similar thresholds, the result will be that the second probability does not exceed a threshold at which the significant movement of interest is recognized until a movement of the bike is indicated by the first indicator and the second indicator over a comparatively long time interval or is considered likely, which results in an increase in the second probability. The second probability thus behaves similarly to the first probability, but results in a more robust result, which is determined with a less quick response. The movement of interest and the significant movement of interest can be utilized in order to trigger different functions. For example, a warning alarm can be triggered by the movement of interest, for example, and a final alarm or user notification can be triggered by the significant movement of interest.

Accordingly, it is advantageous when the detection that the significant movement of interest is given occurs when the second probability exceeds a predefined third threshold. The detection that the movement of interest is given thus occurs in response to the second probability exceeding the predefined third threshold. The third threshold is in this case preferably the same as or similar to the first threshold.

Also, it is advantageous when the detection that the significant movement of interest is no longer present occurs when the first probability falls below the predefined second threshold. The detection that the movement of interest is no longer present thus occurs in response to the fact that the first probability falls below the predefined second threshold. Thus, while the second probability can increase or decrease slower than the first probability, the first probability can also be used in order to infer that there is no significant movement of interest, because the requirements for the significant movement of interest are higher than those for a movement of interest. In other words, if no movement is present, this means that neither a significant movement nor any other movement of the bike can be given. Accordingly, it is also advantageous when it is detected that the movement of interest is no longer given when the second probability falls below the predefined second threshold. This is particularly advantageous when the associated mapping functions drop the second probability faster than the first probability. It is also advantageous when it is detected that the movement of interest and/or the significant movement of interest is no longer given when the first probability and the second probability both fall below the predefined second threshold.

Preferably, the third mapping function is a function $f_3(x_1)$, which describes the third change value, wherein $x_1$ is the value of the first indicator, the third mapping function monotonically increasing and featuring a zero-crossing, wherein, by means the third mapping function for a range of values above the zero-crossing, the first indicator is associated with a third change value that is less than the first change value associated with the first indicator, and/or the fourth mapping function is a function $f_4(x_2)$, which describes the fourth change value, wherein $x_2$ is the value of the second indicator, the second mapping function monotonically increasing and featuring a zero-crossing, wherein, by means of the fourth mapping function for a range of values above the zero-crossing, the second indicator is associated with a fourth change value that is less than the second change value associated with the second indicator.

Thus, it is ensured that the second probability increases more slowly than the first probability.

BRIEF DESCRIPTION OF THE DRAWINGS

Exemplary embodiments of the disclosure are described in detail below with reference to the accompanying drawings. Shown in the drawings are.

DETAILED DESCRIPTION

Figure 1:
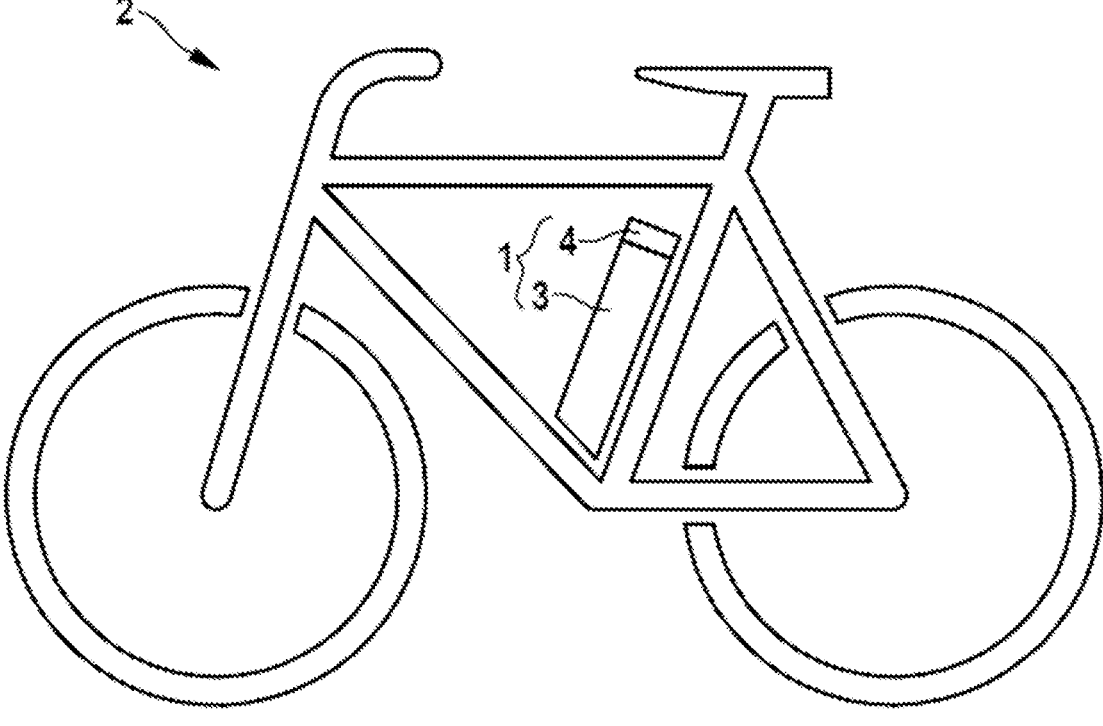
FIG. 1 an electric bike having an apparatus arranged thereon for determining a probability of a presence of a movement of interest, FIG. 2 a schematic illustration of a method for determining a probability of a presence of a movement of interest, FIG. 3 a schematic illustration of an exemplary mapping function, and FIG. 4 an exemplary illustration of a temporal curve of a first probability and a second probability.

FIG. 1 shows a bike 2 on which an apparatus 1 for determining a probability of a presence of a movement of interest is arranged. The apparatus determines whether a movement of the bike 2 is a movement of interest. The apparatus 1 comprises a signal processing unit 3 and a sensor unit 4. The sensor unit 4 can comprise one or more sensors. The apparatus 1 carries out a method 100 for determining a probability of a presence of a movement of interest of the bike 2.

Figure 2:
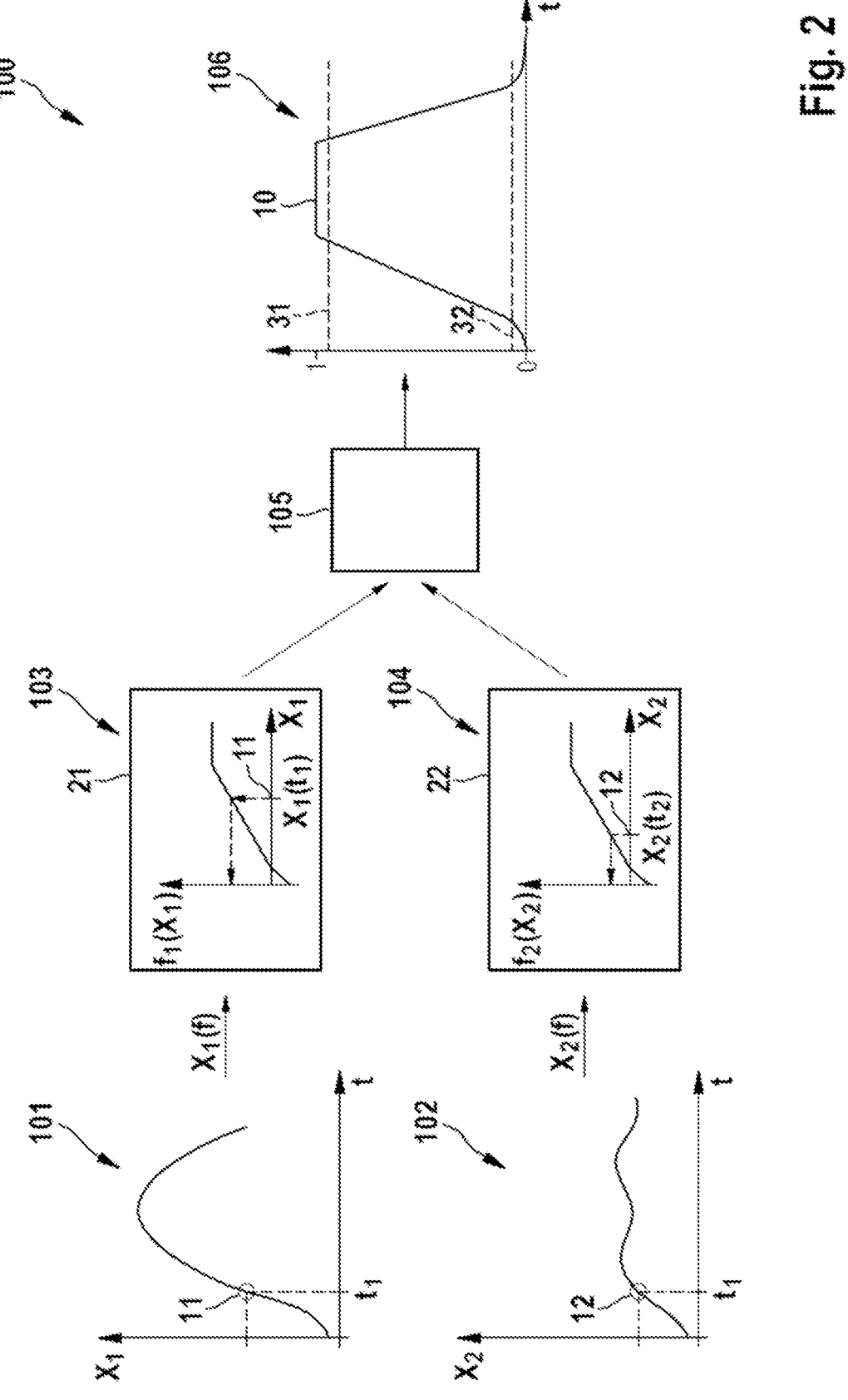

The method 100 is schematically shown in FIG. 2. In the method 100, a detection 101, 102 of a first indicator 11 and a second indicator 12 is first performed.

The first indicator 11 is a value indicating a degree of a first movement of the bike 2 or a probability of a presence of a specific first movement of the bike 2. The first indicator 11 is in this case determined based on measured values of the sensor unit 4. Information is provided by the first indicator 11 indicating whether there is actually a movement of the bike 2 or indicating how likely a certain movement is to exist. The first indicator 11 is in this case continuously redetermined and thus provided over a temporal curve. For example, the first indicator is shown in FIG. 1 over a time axis t.

For example, an inclination angle of the bike 2 is indicated by the first indicator. The greater the inclination angle, the greater the variable value of the indicator. Such an inclination angle could, e.g., be determined based on the information of a gyroscopic sensor of the sensor unit 4. A further example of a first indicator is a value indicating a present acceleration, in particular a vibration, of the bike 2. The greater the vibrations on the bike 2, the higher the value of the indicator. In a further example, the indicator indicates a probability that the bike 2 is being carried. This can be done, for example, based on sensor information of a gyroscopic sensor, with which a rotational speed of the bike in multiple axes is sensed. Based on a correlation in the rotational speed of the bike in multiple axes, it can be concluded whether the bike can be carried. The indicator in this case increases with an existing, non-correlated movement of the bike 2 and thus indicates the probability that the bike is being carried. If this probability exceeds a threshold, then it is detected that the bike 2 is being carried. It should be noted that filtering can also be applied in order to determine the first indicator 11. Thus, it is particularly advantageous when what is referred to as feature gating is applied, in which a weighting of the first indicator is carried out based on a detected movement of the bike by a specific sensor.

The first indicator 11 is thus given by a variable value, which increases in particular when the probability of a presence of a specific first movement increases and then decreases when the probability of a presence of a specific first movement of the bike 2 decreases. Alternatively, the first indicator 11 is a value that represents a movement of the bike 2 directly through a measured value. It should be noted that the first indicator 11 is in this case chosen by way of example such that it increases by a probability. The first indicator 11 thus preferably behaves proportionally to the probability. However, it is also possible for the first indicator 11 to behave counter-proportionally to the probability, as long as the corresponding information is described by the value of the first indicator 11.

A detection 102 of the second indicator 12 is further carried out. The second indicator 12 also indicates a variable value, which describes a degree of a second movement of the bike 2 or a probability of a presence of a specific second movement of the bike 2. The second indicator 12 corresponds in its properties to the first indicator 11. However, a different movement of the bike 2 is indicated compared to the first indicator 11 or a probability of a differently determined second movement of the bike 2 by the second indicator 12. Thus, by means of the first indicator 11 and the second indicator 12, two different pieces of information regarding a movement of the bike 2 are provided. These can be based on either the information of the same sensors with different signal processing or the information of different sensors. It is possible to independently detect whether there is movement of the bike 2 based on the first indicator 11 and the second indicator 12. However, the aim of the method is to combine the information of the first indicator 11 and the second indicator 12 in order to create a more reliable possibility for determining a presence of a movement of interest of the bike 2.

A movement of interest of the bike 2 is a movement that leads to a resultant action. For example, a user is notified that there is a movement of interest of the bike 2, or an alarm is triggered, for example. There can thus also be a movement of the bike 2, which is however not a movement of interest. This is the case, for example, when the bike 2 is parked and is accidentally bumped. In this case, the bike 2 is moved, in principle, but it is not necessary for a user to be notified in this regard.

In FIG. 2, the first indicator 11 and the second indicator 12 are shown over time t. It should be noted that the temporal curve is merely to be understood by way of examples. In one example, the diagrams of FIG. 2 could be understood such that the first indicator 11 indicates the likelihood of the bike 2 being carried. This increases over time and later drops off again. By the second indicator 12, an existing slope of the bike 2 could be indicated. This takes on substantially a specific value and remains nearly constant therewith.

In order to combine the first indicator 11 and the second indicator 12 into a common measured value (hereinafter referred to as the first probability 10), the first indicator 11 and the second indicator 12 are first converted into a common unit. To this end, the first indicator 11 is converted into a first change value and the second indicator 12 is converted to a second change value. This is done by means of an associated mapping function 21, 22, respectively.

Thus, the first change value is first determined from the first indicator 11, which is done by means of a first mapping function 21. With the first mapping function 21, various possible values of the first indicator 11 are each associated with a first change value. In a corresponding manner, the second change value, which is associated with the second indicator 12, is calculated in parallel. This is done by means of a second mapping function 22, a second change value being respectively associated with various possible values of the second indicator 12 by the second mapping function 22.

Figure 3:
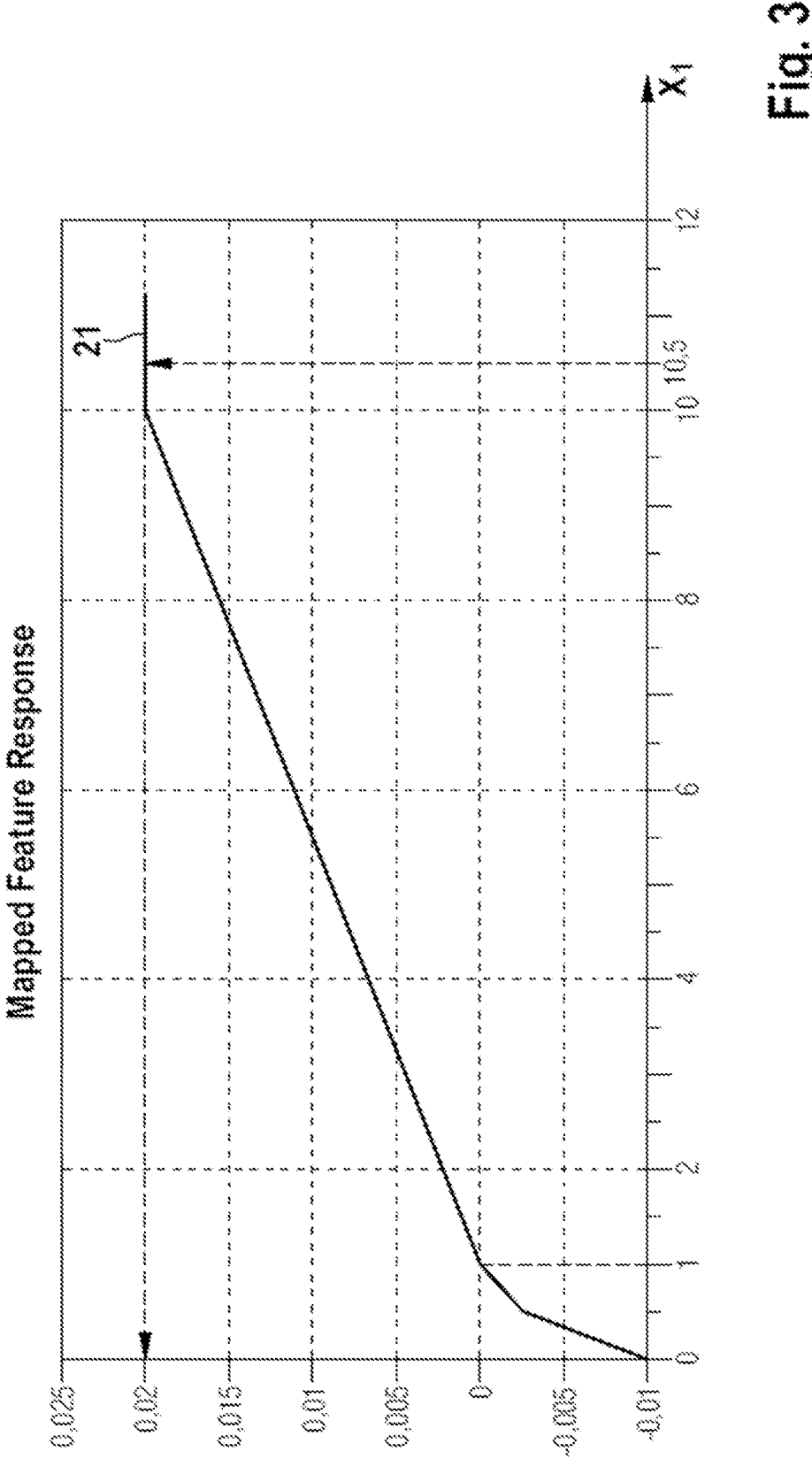

FIG. 3 shows an exemplary mapping function. This will be described below by way of example of the first mapping function 21 for the first indicator 11. However, the remaining mapping functions can be designed in a corresponding manner.

Via an x-axis, possible values of the first indicator 11 are indicated in the diagram shown in FIG. 3. The first indicator 11 can in this case only take on, e.g., values greater than zero. By means of the first mapping function 21, a first change value is associated with each possible value of the first indicator 11. In this case, the first change value is given according to the y-axis of the diagram shown in FIG. 3. For example, in a simple example, this results in a value of the first indicator 11 of 10.5 being projected onto a first change value of 0.02. The first mapping function 21 thus transforms the first indicator 11 into a first change value.

The mapping function is in this case preferably defined as follows:

$$
f(x, \alpha, \beta, \gamma) = \begin{cases} \text{if } (x <= \alpha) \text{ then} - \dfrac{\text{timespan}}{\text{stilltime}} \\[2mm] \text{if } (x <= \beta) \text{ then} - \dfrac{\text{timespan} \cdot (\beta - x)}{\text{stilltime} \cdot (\beta - \alpha)} \\[2mm] \text{if } (x < \gamma) \text{ then} - \dfrac{\text{timespan} \cdot (x - \beta)}{\text{detectiontime} \cdot (\gamma - \beta)} \\[2mm] \text{if } (x >= \gamma) \text{ then} - \dfrac{\text{timespan}}{\text{detectiontime}} \end{cases}
$$

The parameters $\alpha$, $\beta$, and $\gamma$ in this case define the first indicator 11 values at which the slope of the first mapping function changes. The parameters "timespan" and "stilltime" define how long the value of the indicator in this range of the mapping function must lie so that this leads to a drop in the first probability to "0." The parameters "timespan" and "detection time" define how long the value of the indicator must be in this range of the mapping function so that this leads to a rise in the first probability to "1."

The first change value in this case defines in which way a first probability 10 is to be changed when the first indicator 11 leads to this first change value. It can be seen that higher values of the first indicator 11 result in comparatively higher first change values. The first mapping function 21 is thus a function $f_1(x_1)$ describing the first change value. In this case, $x_1$ is the value of the first indicator 11. The first mapping function 21 is in this case monotonically increasing and features a zero-crossing. Thus, it can be seen by way of example from FIG. 3 that the first mapping function 21 features a zero-crossing (chosen by way of example) at a value of the first indicator of 1. Therefore, for values of the first indicator 11 lower than "1," the first mapping function 21 results in negative first change values, and for values of the first indicator greater than "1," it results in positive first change values.

The exemplary first mapping function 21 described in FIG. 3 is exemplary of all other mapping functions used in the context of the embodiments described herein. The mapping functions are in this case not necessarily identical, because the ranges of values of the different indicators can also be selected variously. However, it is in any case advantageous when the respective mapping function is monotonically increasing and features a zero-crossing. Thus, in particular, the second mapping function 22 is a function $f_2(x_2)$, which, however, describes the second change value. In this case, $x_2$ is the value of the second indicator 12, the second mapping function 22 likewise monotonically increasing and featuring a zero-crossing. The mapping function can have any curved shape and is selected merely by way of example in FIG. 3.

Based on the first change value and the second change value, the value of the first probability 10 is adjusted. The first probability 10 describes a probability that the movement of interest is given. The first probability 10 here is within a range of values from "0" to "1" and is limited to this range of values. However, these thresholds are also selected merely as examples and are selected in an advantageous ratio compared to the change values that result from the first mapping function 21 of FIG. 3. The value of the first probability 10 is incremented or decremented in a combination step 105 of the method 100 based on the first change value and based on the second change value. Various procedures can in this case be employed in order to modify the first probability 10 based on the first change value and the second change value.

For example, the first probability 10 is adjusted by comparing the first change value to the second change value and adding the respective greater change value to the first probability 10. If the respective change value is positive, then the first probability 10 is incremented, and if the respective change value is negative, then the first probability 10 is decremented according to the respective change value. Initially, the first probability 10 is initialized as zero. Depending on the continuously determined first and second change values, the first probability 10 will thus increase or decrease over time, depending on the way in which the bike 2 is moved.

If the first probability 10 exceeds a predefined first threshold, for example a value of 0.999, it is detected that there is a movement of interest of the bike 2. If the first probability 10 falls below a second threshold, for example a value of 0.001, after detecting a movement of interest in its temporal curve, it is detected that the movement of interest is no longer given. As can also be seen from FIG. 2, the first change value and the second change value are thus merged in order to adjust the first probability 10 in the combination step 105. Based on the resulting temporal curve of the first probability 10, it is detected 106 whether the movement of interest is given. In FIG. 2, an exemplary temporal curve of the first probability 10 is shown for this purpose. For example, it is initially incremented due to a presence of positive first or second change values until it exceeds the first threshold 31. At this time, a presence of a movement of interest of the bike 2 is detected. This subsequently drops again, because combining the change values results in a negative change value. If the first probability 10 again falls below the second threshold 32, it is detected that the movement of interest of the bike 2 is no longer given.

Optionally, the method shown in FIG. 2 can be extended by capturing further indicators and further mapping functions, whereby the resulting change values are merged in the combination step 105.

Given that the change values are determined by the respective mapping functions, the mapping function can also define how quickly the first probability for specific values of the indicators increases. By designing the mapping functions differently for different indicators, it can be achieved that individual indicators are weighted higher than other indicators. For example, a degree of an inclination angle of the bike 2 could be weighted as less relevant than a probability of carrying the bike 2. This would make sense, for example, because an angle of inclination of the bike 2 can also be significantly changed by an unwanted bumping of the bike, but carrying the bike 2 is a comparatively clear indicator of a movement of the bike away from its current parking space and thus for possible theft.

Optionally, in addition to a movement of interest of the bike 2, a probability of a presence of a significant movement of interest of the bike 2 is also determined. A presence of a significant movement of interest is in this case essentially the same as the determination of the probability of a movement of interest. The probability of a presence of a significant movement of interest of the bike 2 is in this case performed based on the same indicators 11, 12 as well as determining the probability of a movement of interest. However, other mapping functions are in this case used, which lead to a slower increase in the likelihood of the significant movement of interest (hereinafter referred to as the second probability 13).

The determination of the second probability 13 is initially independent of the determination of the first probability 10. A third change value is in this case determined based on the first indicator 11, which is done by means of a third mapping function. The third mapping function $f_3(x_1)$ is in this case likewise monotonically increasing and features a zero-crossing. In this case, the value $x_1$ describes the value of the first indicator 11, and a third change value is associated with the first indicator 11, in each case by means of the third mapping function. The third mapping function is in this case selected such that the third change value for at least some of the possible values of the first indicator 11 is less than the first change value. This can be done, for example, in that an amount of the slope of the mapping function exemplified in FIG. 3 is selected to be less for all regions. The first indicator 11 is thus not only mapped to the first change value, but is also mapped to the third change value, which, however, generally leads to comparatively lower amounts of the change value. Accordingly, the second indicator 12 is used in order to calculate a fourth change value, which is based on a fourth mapping function. The fourth mapping function is thus a function $f_4(x_2)$ describing the fourth change value. In this context, $x_2$ is the value of the second indicator 12, the second mapping function also monotonically increasing and featuring a zero-crossing. The fourth mapping function is selected such that the fourth change value is less than the second change value for at least some of the possible values of the second indicator 12. For this purpose, by means of the fourth mapping function for a range of values above the zero-crossing, such a fourth change value is associated that is less than the second change value associated with the second indicator 12 by means of the second mapping function.

According to the first and the second change values, the second probability 13 is adjusted by the third and the fourth change values. The second probability 13 is also initialized with the value "0" and is then incremented or decremented, based, e.g., on the value of the respective larger change value from the third and fourth change value.

Figure 4:
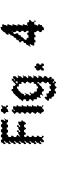

A curve of the second probability 13 is shown by way of example in FIG. 4. Both the temporal curve of the first probability 10 and the temporal curve of the second probability 13 are based on the common first and second indicators 11, 12. However, the first probability 10 increases significantly faster, which is due to the association of higher change values by the first and second mapping functions 21, 22 to the first indicator and the second indicator 11, 12. This results in detection at a first time point 14 that there is a movement of interest of the bike 2. The temporal curve of the second probability 13 is compared to a third threshold 33, which corresponds to the first threshold 31. If the third threshold is exceeded, then a presence of a significant movement of interest is detected. However, this is not the case in the example shown in FIG. 4, because no further movement of the bike 2 takes place even at a second time point 15, and thus both the first probability 10 and the second probability 13 decrease again. The probabilities 10, 13 determined in FIG. 4 thus lead to a movement of interest of the bike 2 being detected, but this is not classified as a movement of significant interest in the following. If the first probability 10 falls below the second threshold 21, it is detected that the movement of interest is no longer given. The second probability 13 is not necessarily compared to its own threshold in order to detect that a previously detected significant movement of interest is no longer given. In this case, it is sufficient for the first probability 10 to fall below the second threshold 32. This can in particular be understood in that a more sensitive parameter is given due to the first probability 10 than due to the second probability 13.

With the method according to the disclosure, different movement levels can thus be detected, which are referred to as a movement of interest and a significant movement of interest. In this context, it is generally advantageous when the first indicator 11 and the second indicator 12 are selected such that they are not correlated to one another. Thus, the first indicator 11 and the second indicator 12 preferably capture particularly different movement characteristics of the bike 2. Given that it is generally necessary for a movement of the bike 2 to occur over a certain period of time before a movement of interest is detected, because the value of the first probability 10 must initially increase over time in order to reach the first threshold, this method also leads to short fluctuations in detected measured values and indicators not leading to false detections. A continuous monitoring of degrees of movement or probabilities for movements adds up until a movement of interest can be assumed. Even short pauses in the event of a movement of interest that is otherwise sustained in reality do not immediately lead to the assumption that the movement of interest of the bike is no longer given. Also in this case, a certain amount of time is initially required until the first probability 10 falls below the second threshold 32. It is thus also avoided that rapidly changing states of the bike 2 are indicated. It is also possible that comparatively weak indicators of a movement of the bike 2 over a longer time range will cause a movement of interest to be detected. Thus, for example, it can be achieved that a particularly careful movement of the bike also leads to a detection of a movement of interest, even if this detection takes longer than a comparatively clear movement of the bike 2.

The method 100 according to the disclosure is preferably used for theft detection. The method 100 is in this case preferably carried out by the apparatus 1 when the bike 2 is in an inactive state. The signal processing unit 3 as well as the associated sensor technology 4 is in this case preferably supplied by means of a secondary power source, which is not the primary power source for driving the electric bike 2. For example, it is possible for a primary battery of the bike 2 to be removed for a charging operation, and the method according to the disclosure is then performed further based on a smaller, secondary power source. Preferably, a notification is sent to a user when it is detected that there is a movement of interest or a significant movement of interest.

In addition to the above disclosure, reference is explicitly made to the disclosure of FIGS. 1 to 4.

What is claimed is:

1. A method for determining a probability of a presence of a movement of interest of a bike, comprising:

sensing a first indicator value indicating a degree of a first movement of the bike or a probability of a presence of a specific first movement of the bike;

sensing a second indicator value indicating a degree of a second movement of the bike or a probability of a presence of a specific second movement of the bike;

calculating a first change value from the first indicator value by way of a first mapping function, wherein, by way of the first mapping function, various possible values of the first indicator value are respectively associated with a first change value;

calculating a second change value from the second indicator value by way of a second mapping function, wherein, by way of the second mapping function, various possible values of the second indicator value are respectively associated with a second change value; and adjusting a first probability, which is a probability of a presence of a movement of interest, wherein the first probability is incremented or decremented, depending on the first change value and the second change value, wherein the movement of interest is associated with a possible theft of the bike, and wherein the first probability is used to determine when the movement of interest has occurred and when the movement of interest is no longer occurring.

2. The method according to claim 1, further comprising: detecting that the movement of interest has occurred when the first probability exceeds a predefined first threshold.

3. The method according to claim 2, further comprising: detecting that the movement of interest is no longer occurring when the first probability falls below a predefined second threshold, wherein the predefined second threshold is less than the predefined first threshold.

4. The method according to claim 1, wherein:

the first mapping function is a function $f_1(x_1)$ describing the first change value, wherein $x_1$ is a value of the first indicator value, and wherein the first mapping function is monotonically increasing and features a zero-crossing, and/or the second mapping function is a function $f_2(x_2)$ describing the second change value, wherein $x_2$ is a value of the second indicator value, and wherein the second mapping function is monotonically increasing and features a zero-crossing.

5. The method according to claim 1, wherein the first mapping function and/or the second mapping function are selected such that:

the first change value and the second change value maximally take on a size of a predefined maximum value, and/or the first change value and the second change value minimally take on a size of a predefined minimum value.

6. The method according to claim 5, wherein:

the first change value and the second change value maximally take on a size of the predefined maximum value, which is less than a first threshold, and/or the first change value and the second change value minimally take on a size of the predefined minimum value, an amount of which is less than a second threshold.

7. The method according to claim 1, further comprising: calculating a third change value from the first indicator value by way of a third mapping function, wherein, by way of the third mapping function, various possible values of the first indicator value are respectively associated with a third change value, wherein the third mapping function is selected such that the third change value is less than the first change value for at least some of the various possible values of the first indicator value;

calculating a fourth change value from the second indicator value by way of a fourth mapping function, wherein, by way of the fourth mapping function, various possible values of the second indicator value are respectively associated with a fourth change value, wherein the fourth mapping function is selected such that the fourth change value is less than the second change value for at least some of the various possible values of the second indicator value; and adjusting a second probability, which is a probability of a presence of a significant movement of interest, wherein the second probability is incremented or decremented depending on the third change value and the fourth change value.

8. The method according to claim 7, further comprising: detecting that the significant movement of interest has occurred when the second probability exceeds a predefined third threshold.

9. The method according to claim 8, further comprising: detecting that the significant movement of interest is no longer occurring when the first probability falls below a predefined second threshold, and/or detecting that the movement of interest is no longer occurring when the second probability falls below the predefined second threshold.

10. The method according to claim 7, wherein:

the third mapping function is a function $f_3(x_1)$ describing the third change value, wherein $x_1$ is a value of the first indicator value, wherein the third mapping function is monotonically increasing and features a zero-crossing, wherein, by way of the third mapping function for a range of values above the zero-crossing, the first indicator value is associated with a third change value that is less than the first change value associated with the first indicator value, and/or the fourth mapping function is a function $f_4(x_2)$ describing the fourth change value, wherein $x_2$ a the value of the second indicator value, wherein the fourth mapping function is monotonically increasing and features a zero-crossing, wherein, by way of the fourth mapping function for a range of values above the zero-crossing, the second indicator value is associated with a fourth change value that is less than the second change value associated with the second indicator value.

11. An apparatus for determining a probability of a presence of a movement of interest of a bike, comprising:

a signal processing unit configured to:

sense a first indicator value indicating a degree of a first movement of the bike or a probability of a presence of a specific first movement of the bike, sense a second indicator value indicating a degree of a second movement of the bike or a probability of a presence of a specific second movement of the bike, calculate a first change value from the first indicator value by way of a first mapping function, wherein, by way of the first mapping function, various possible values of the first indicator value are respectively associated with a first change value, calculate a second change value from the second indicator value by way of a second mapping function, wherein, by way of the second mapping function, various possible values of the second indicator value are respectively associated with a second change value, and adjust a first probability, which is a probability of a presence of a movement of interest, wherein the first probability is incremented or decremented depending on the first change value and the second change value, wherein the movement of interest is associated with a possible theft of the bike, and wherein the signal processing unit uses the first probability to determine when the movement of interest has occurred and when the movement of interest is no longer occurring.

\* \* \* \* \*